United States Patent [19]

Wienecke

[11] Patent Number: 5,774,220
[45] Date of Patent: Jun. 30, 1998

[54] CONTINUOUS CONTACTLESS MEASUREMENT OF PROFILES AND APPARATUS FOR CARRYING OUT THE MEASUREMENT PROCESS

[75] Inventor: Siegfried Wienecke, Dortmund, Germany

[73] Assignee: Mesacon Gesellschaft fur Messtechnik mbH, Germany

[21] Appl. No.: 546,512

[22] Filed: Oct. 20, 1995

Related U.S. Application Data

[63] Continuation of Ser. No. 272,643, Jul. 11, 1994, abandoned, which is a continuation of Ser. No. 910,321, filed as PCT/EP91/02181, published as WO92/08949, May 29, 1992, abandoned.

[30] Foreign Application Priority Data

Nov. 20, 1990 [DE] Germany ............................ 40 37 383.5

[51] Int. Cl.⁶ ............................ G01B 11/24; G01B 11/10
[52] U.S. Cl. ...................... 356/376; 356/386; 250/559.23
[58] Field of Search .................................... 356/376, 384, 356/385, 386; 250/560, 559.24, 559.22, 559.23

[56] References Cited

U.S. PATENT DOCUMENTS

| | | | |
|---|---|---|---|
| 5,028,798 | 7/1991 | Biswas et al. ........................... | 356/385 |
| 5,073,816 | 12/1991 | Wakefield et al. ...................... | 257/784 |

FOREIGN PATENT DOCUMENTS 0 039 143  11/1981  European Pat. Off. .

OTHER PUBLICATIONS

Patent Abstracts of Japan, vol. 6, No. 248 (P–60)(1126), Dec. 7, 1982.
Patent Abstracts of Japan, vol. 9, No. 72 (P–345)(1795), Apr. 2, 1985.

Primary Examiner—F. L. Evans
Attorney, Agent, or Firm—Banner & Witcoff, Ltd.

[57] ABSTRACT

In a process for continuous contactless measurement of profiles, in particular profiles moving in the axial direction, by means of which internal contours of a profile can also be measured, where they can be reached by a measurement beam and permit reflection onto a receiver, probes, by means of which a surface segment of an object is continuously scanned in accordance with the triangulation principle by means of a laser light measurement beam in a particular measurement region of the respective probe sequentially or by points one after the other and with a variable and pre-settable step size or resolution within the measurement region, and using the beam reflected by the object surface and received by a fixed receiver on the basis of the geometrical relationships the spacing of each measured point from the probe is determined in the form of local measured data, are arranged in a mounting all around the profile and spaced therefrom and are arranged in predetermined angular positions with respect to one another such that a contour segment of the profile is associated with the measurement region of each probe as a surface segment, in particular with overlapping measurement regions of adjacent probes and with a system calibration having a reference workpiece with precise contours and dimensions, for transferring the contour segments to a global coordinate system and for grouping them together to form an overall image.

19 Claims, 22 Drawing Sheets

CONTINUOUS CONTACTLESS MEASUREMENT OF PROFILES AND APPARATUS FOR CARRYING OUT THE MEASUREMENT PROCESS

This application is a continuation of application Ser. No. 08/272,643, filed Jul. 11, 1994, which is a continuation of 07/910,321, filed as PCT/EP91/02181, Nov. 19, 1991 published as WO92/08949, May 29, 1992 both now abandoned.

The invention relates to a process for continuous contactless measurement of profiles, in particular profiles moving in the axial direction, and to an apparatus for carrying out a measurement process for profiles.

When producing rolled, drawn or extruded profiles, for example of steel, aluminium or plastics, it is important to obtain information on the contour or the cross-section of the profile during the production process wherever possible. The information is used both for monitoring the maintenance of tolerances and for complete documentation of the production results. This requirement has led to the development and introduction of processes and apparatus for continuous measurement and observation of profiles in on-line operation. Monitoring and observation of the profiles has a direct influence on production, because it is possible to react quickly to any undesired deviations in dimension or profile.

The processes and apparatus which were known hitherto for measurement or observation of profiles are either based on the silhouette principle or follow the light-section procedure.

In the silhouette system, the profile passes across a light curtain of light beams which are deflected parallel, in particular laser light beams. The time which elapses while the beams are covered by the profile is measured. However, this value only reflects the external cross-section of the profile. As a rule, it is inadequate to observe the spacing of the furthest removed material points in an angular position of the cross-section. Round material can fulfil the tolerance requirements, for example by being non-circular, in one direction but can lie outside the tolerance limit at an offset of 90° thereto.

It is also known to carry out a complete all-round scanning of the profile by rotation or oscillation of the measuring device. Here, however, difficulties arise. On the one hand, the rotation or oscillation can only be carried out at a limited frequency. In a known system of this type, the speed of rotation is for example between 60 and 200 rev/min. On the other hand, this system makes high requirements of the measuring devices and of the supply systems for media such as water and air, and finally of the signal and voltage source or line systems.

A very important disadvantage of silhouette measuring systems consists in the fact that with this measurement process a concave surface contour cannot be detected. Similarly, concealed edges such as occur with an angled, T-shaped or double T-shaped profile cannot be measured using this measurement process.

With the light-section procedure, a laser beam is either widened by way of the cylindrical lens or deflected by means of a resonance mirror, and in this way produces a light strip on the surface. The direction of illumination and the direction of imaging here form a fixed angle ratio. For this reason, the light-section procedure allows a space measurement process in which a plurality of points are brought to the profile to be observed at the same time. Planar receivers are used as detectors. The CCD arrays which can be used at justifiable expense only have a small number of pixels of approximately 512×512 points, however. This means, however, that with a predetermined adequate resolution the measurement region available is narrowed. It is furthermore disadvantageous that expensive and time-consuming algorithms are required for evaluating the CCD arrays. These are special algorithms for measured data selection, or else two-dimensional statistical operations are used.

It is thus the object to provide a process for the measurement of profiles, by means of which it is also possible to admeasure internal contours of a profile which can be reached by a measurement beam and allow reflection onto the receiver. Moreover, the process is intended to permit, as far as possible, a high measuring speed and measuring accuracy. It should enable the use of reliable measuring apparatus which is relatively insensitive to external influences or can at least be made insensitive to or protected from disruptive or damaging influences at low cost.

In accordance with the invention, this object is achieved in that probes, by means of which a surface segment of an object is continuously scanned in accordance with the triangulation principle by means of a laser light measurement beam in a particular measurement region of the respective probe, sequentially or by points one after the other and with variable and pre-settable step size or resolution within the measurement region, and using the beam reflected by the object surface and received by a fixed receiver on the basis of the geometrical relationships the spacing of each measured point from the probe is determined in the form of local measured data, are arranged in a mounting all around the profile and spaced therefrom and are arranged in predetermined angular positions with respect to one another such that a contour segment of the profile is associated with the measurement region of each probe as a surface segment, the measurement regions of adjacent probes overlapping one another and the overall contour which is to be measured, of the profile, being determined by the measurement regions, and in that a system calibration using a reference workpiece with precise contours and dimensions is carried out by determining the probe positions (three coordinates, two reflection angles) in a reference coordinate system, and in that, using the data of the system calibration, the predetermined set data of the profile and the local measured data resulting as the point of intersection of the measurement beam with the object, and using a position calculation for the profile to be measured and by way of coordinate transformations, the contour segments are transferred to a global coordinate system and grouped together to form an image.

In contrast to the known prior art, the invention is consequently based on the idea of scanning the contour of a profile, which may easily have either a concave surface contour in one or more regions or indeed concealed edges such as the above-mentioned angular, T-shaped or double T-shaped profile, at points one after the other such that precise spacing information with respect to a fixed reference plane is obtained for each measured point in the form of signals or in the form of local measured data which can be further processed in a suitable way, as will be explained below, in order to obtain the desired information on the profile contour. The arrangement according to the invention of probes operating in accordance with the triangulation principle such that the measurement regions of adjacent probes overlap one another allows the local measured data obtained from the probes to be linked for grouping together and illustrating the overall contour.

The basic features of the triangulation process used within the context of the invention and already known for surface measurements is explained in the second part of the description with reference to figures.

To distinguish it from the light-section procedure, it should be noted that in the known light-section procedure there is no spacing measurement, sequential or by points one after the other, but instead of this a quantity of points is applied virtually simultaneously to the profile in the form of a light line and the reflection is detected, so that a two-dimensional receiver is necessarily required for the detection. Apart from the complex algorithms, already mentioned, for evaluation of the two-dimensional image information, a substantially longer illumination time is also required for the receiver array than for example for the position-sensitive diode or the CCD line as in the invention. The difference here is in the region of a factor of 10 for the illumination time.

A number of advantages which are achieved by the process according to the invention will be explained below.

First, it should once again be noted that the use of triangulation probes means that even internal, in particular for example concave contours in the surface of the profile, but also concealed edges such as in the case of double T-shaped carriers or U-shaped profiles can be detected.

A further advantage is very important, in accordance with which the scanning region to be set can be matched to the profile to be observed, so that it is in no way necessary, for profiles having different dimensions, always to run through the complete measuring range of the respective measuring apparatus. As a result of this, a control or influencing of the scanning rate is achieved. Moreover, in short time intervals of for example 2 ms with commercially available probes in which these time intervals are determined by the positioning time of the mirror and the illumination time of the receiver, measured data for the position calculation and for the calculation of the specific profile geometry are available.

A further very important advantage of the process according to the invention consists in the fact that positioning of each light point can be selected individually or predetermined via the triggering of the mirror system performing the stepwise scanning. In this way, it is possible to select the point density in important and critical regions to be at a maximum, that is to say to achieve a maximum resolution capacity, and to set the point density to be smaller in regions of subsidiary significance. The maximum resolution capacity depends on the smallest settable quantization steps of the mirror scanner, determined by the smallest step size. The overall scanning region is divided, with a commercially available probe, for example into 2048 steps. However, positioning can be set such that either each discrete angled step is triggered, that is to say every possible measured point is used, and the spacing thereof is measured, or scanning takes place with an arbitrarily pre-selected step size of the measurement region associated with the respective probe, or the associated contour segment of the profile is scanned, or the step size is matched individually to follow a determinable requirement pattern resulting from the respective significance of the individual regions from which the contour segment is composed. As a result of this variation in the resolution or the target point density, unnecessary points and thus unnecessary time losses and superfluous measured data processing are avoided.

The result of this is already an advantage which is also very important, in accordance with which higher measuring speeds or measuring frequencies are achieved by varying the resolution.

The very important advantage of a comparatively short illumination time has already been mentioned. In conjunction with the positioning time for the mirror deflection, which is approximately 1 ms, it is possible to start the data evaluation, namely the data selection, and the coordinate transformation after only approximately 2 ms, and at this time the first values about the contour are already available.

In accordance with the invention, a particular contour segment of the profile is associated with each probe. The arrangement of the triangulation probes around the profile to be observed depends on the permissible reflection angles, the material geometries and the nature of the surface of the profile to be tested. As can be seen below from a corresponding illustration, for example, the permissible reflection angle when observing a round profile is in the region of at most approximately 45°, depending on the nature of the material.

The local measured data occurring with the individual probes, that is to say the spacing values, are transformed by way of coordinate transformations and special algorithms for position calculation into the reference coordinate system and thus grouped together to form an overall image.

As a further advantage of the process according to the invention, the possibility of simple evaluation of the CCD line information should be mentioned. The address of the illuminated CCD pixel represents the spacing value. Here, there is associated with the counter value a binary numerical value which indicates, multiplied by the resolution factor, a spacing value in polar coordinates. In order to obtain the actual spacing of the contour segment from the probe reference edge, this spacing value of the image sensor must be transformed from polar coordinates into Cartesian coordinates. This transformation is performed in accordance with the following conversion formula:

$X_u = 1 \times \sin\alpha$ $Z_u = 1 \times \cos\alpha$

Here, 1 is the base spacing, and the angle α corresponds to the angle deflection of the mirror drive system. These local measured data are then transformed with the aid of the reconstruction and position determination programs into the reference coordinate system.

The measurement beams of the probes do not necessarily have to lie in a common measurement plane transverse to the profile to be measured. A further development of the process, in accordance with the invention, consists rather in the fact that the measurement beams of the probes are directed towards the profile and reflected in planes offset parallel in the axial direction of the profile. Here, the planes in which the measurement beams lie are at a fixed spacing from one another. Measurement in different planes precludes mutual influencing of the measured results, in particular of adjacent probes which have an overlap region.

Especially for round profiles and other profiles with a relatively even contour shape along the periphery, it is advantageous if the probes are arranged symmetrically around the profile at the same angle spacing.

If the profile tends to move out of the measurement field, it is advantageous to provide restricted guidance for the profile in particular in front of but where appropriate also behind the measurement plane. In the case of profiles with relatively pronounced sideways movements in the region of the measurement field, although this can be remedied by enlarging the measurement field appropriately, correspondingly higher costs are associated with this measure so that restricted guidance represents a substantially simpler means.

For the evaluation and linking of the local measured data, it is provided in accordance with the invention that the local measured data are evaluated by the parallel processing technique using a hardware comprising link adapters, TRANSPUTER® hereafter "microprocessor") units and microprocessor graphics, the software modules used comprising a profile description file, a reference position module and calibration modules and scanner data.

A very substantial part of the invention is formed by an apparatus for the measurement of profiles which is particularly suitable for carrying out the above-mentioned process. In accordance with the invention, for this purpose in a measurement apparatus a plurality of probes are arranged in the shape of a star and with a pre-selected angle position with respect to one another around a measurement chamber, and their measurement beams may be directed substantially inwards towards the measurement chamber, through which the profile to be measured may be moved axially. The number of probes to be arranged depends on how many contour segments the overall contour of the profile to be measured has to be divided into. The measurement beams of the probes arranged in the shape of a star are directed radially inwards towards the profile to be measured, and this profile is moved axially through the measurement chamber for the measurement.

Advantageously, each probe is associated with its own probe carrier. It is to be secured adjustably thereto such that the measurement beam and the reflected beam allow the necessary local measured data from the contour segment of the profile associated with the probe to be obtained. Each probe carrier is secured to the internal measurement chamber.

A further development of the invention is characterized by removable covers which form substantially closed probe chambers with or on the probe carriers. The probe chambers provide a protection against damage for the probes, but also provide the possibility of conditioning the environmental atmosphere of the probes. The hoods, where appropriate in a divided construction, are removable in order to obtain easy access to the probes.

Furthermore, it is provided in accordance with the invention that the measurement chamber is divided off from the probe carriers by a wall running all the way round and having measurement windows. The measurement windows ensure the necessary protection for the probes to thermal and mechanical stresses and to soiling from the region of the measurement chamber. Moreover, the measurement windows ensure free entry for the beam path in the case of a probe chamber which is otherwise closed all around.

In accordance with the invention, the measurement chamber is of double-walled construction to form an annular channel for guiding through media capable of flow, such as, in particular, cooling water. This measure also serves to protect the probes by keeping the temperature in the wall region constant.

In accordance with the invention, it is provided that there be arranged below or next to the measurement chamber, between two probe carriers, a water chamber having connections, from which water chamber cooling water is supplied in a cycle to the annular channel of the measurement chamber. This arrangement allows integration into the overall apparatus of the structural and connecting parts necessary for the cooling water cycle.

Either instead of the above-mentioned cooling system in an annular channel formed by the double-walled construction of the measurement chamber, or indeed as an additional measure, it is furthermore provided in accordance with the invention that an annular insert, which is formed from two annular chambers connected to one another in the measurement region by connection pipes running outside the measurement beams to guide through media capable of flow, such as cooling water, may be inserted substantially coaxially into the measurement chamber and secured there, and is provided with connections for the supply and removal of a flow medium such as cooling water. To keep the actual measurement region of the measurement chamber free, the annular insert is consequently preferably interrupted in the centre or divided into two annular chambers which are connected to one another by way of connection pipes lying outside the measurement and reflection beams.

Finally, it is also provided in accordance with the invention that the probe chambers can be connected to an aeration system for conditioning or keeping constant the environmental temperature of the probes, by means of which aeration system air which has been conditioned or temperature-controlled in a predetermined way can be supplied to the probe chambers.

For this aeration system, in accordance with the invention a housing can be placed on the apparatus and forms with the end wall terminating or surrounding the measurement chamber at one end side an annular air channel which is connected by way of inlet openings to the probe chambers.

Advantageously, a covering may be secured on the side of the apparatus remote from the aeration system, and into this cover a restricted guidance for the profile may for example also be inserted.

For the overall structure of the apparatus, it is provided in accordance with the invention that the star-shaped arrangement of the probe carriers is formed from two plates arranged spaced from one another and substantially comprising a hub-shaped central part and arms going out in a star shape therefrom, these plates being connected to one another at least centrally by axial webs or by the measurement chamber walls to form a rigid construction. This structure of the measurement apparatus can be seen in detail from the following explanations of the drawings.

Embodiments of the invention are explained below in more detail with reference to the drawing. As far as the process according to the invention is concerned, an embodiment thereof is also described with reference to the representations in the drawing, in which.

Figure 1:
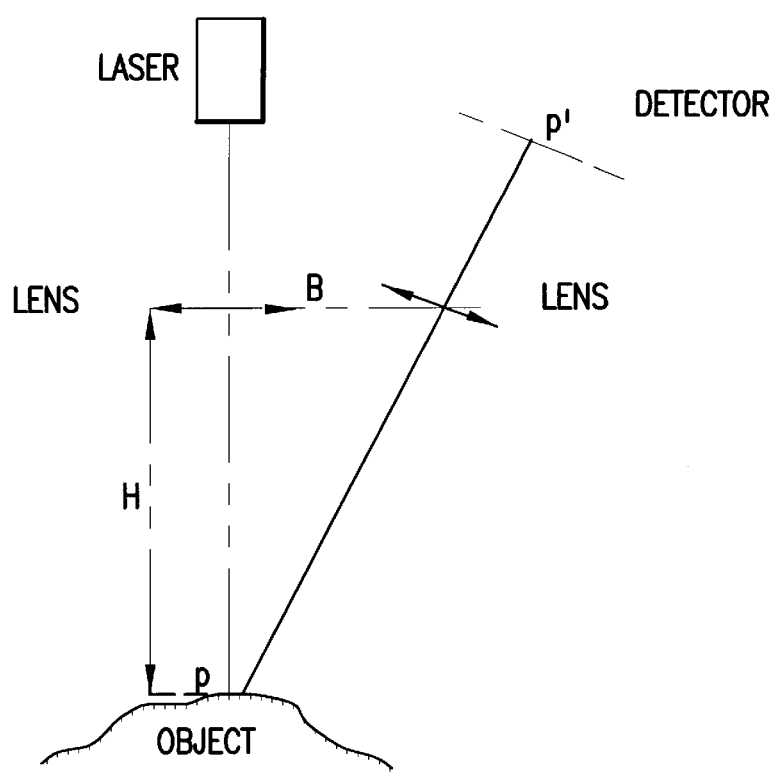
FIG. 1 shows a sketch to illustrate the triangulation principle which is used in the process according to the invention.

FIG. 1 illustrates, purely diagrammatically, the arrangement utilized when using the triangulation process, comprising laser, lens, object and detector with lens placed in front of it. A light beam marks on the object, which corresponds to a contour segment in the case of profile measurement, a point P of which an image is formed by the receiving lens on a detector, for example a position-sensitive diode or a CCD line. The advantage when using CCD lines is the absolutely fixed scale, since the pixel spacing is predetermined to be fixed. The resolution and the accuracy are determined by this and are +/−1 pixel. The inclination of the imaging direction with respect to the illumination direction has the effect that the spacing H of the scanning point is converted to a defined point image position on the detector. The spacing H is thus calculated from the focal point position of the light spot on the receiver unit and the geometrical data of the arrangement. The special arrangement as illustrated in FIG. 1 fulfils the Scheimpflug condition for increasing the definition of the image.

Figure 2:
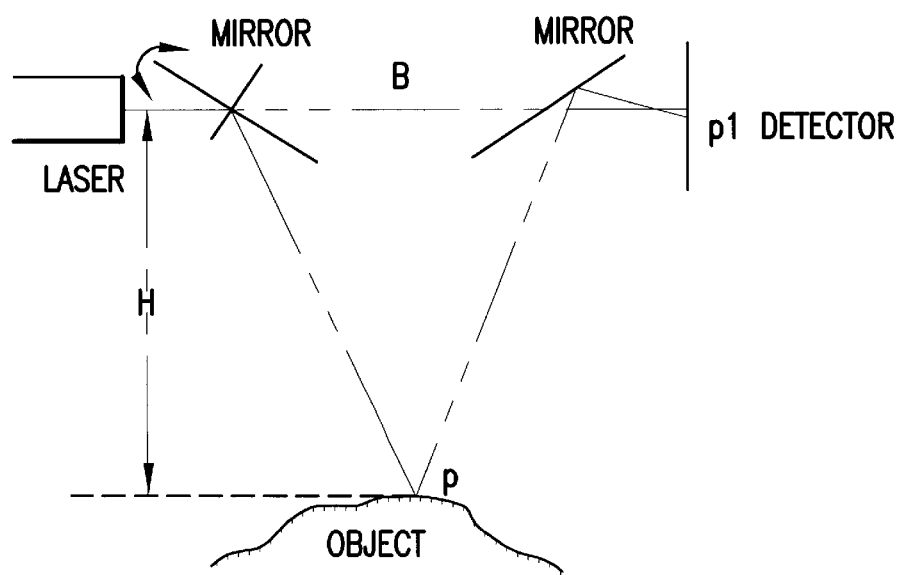
FIG. 2 shows a diagrammatic representation of the principle of the mode of operation of the probes used within the context of the process according to the invention.

For two-dimensional scanning as is used with the process according to the invention, the beam coming from the probe or from the laser is guided by controlled deflection through the object or through the contour segment of the profile, in accordance with FIG. 2. The light beam is deflected by way of controllable mirrors (galvanometer scanners), as is illustrated diagrammatically in FIG. 2, or with the aid of acousto-optical modulators. When using, for example, a galvanometer scanner, it is possible to position the light point in a controlled manner on specific surface points. The controllable mirrors are brought, fixedly coupled, into the beam path of illumination and imaging. Using the optical arrangement illustrated in principle, a sequential scanning of the profile or object contour in a particular segment can be carried out as already explained above in detail.

Figure 3:
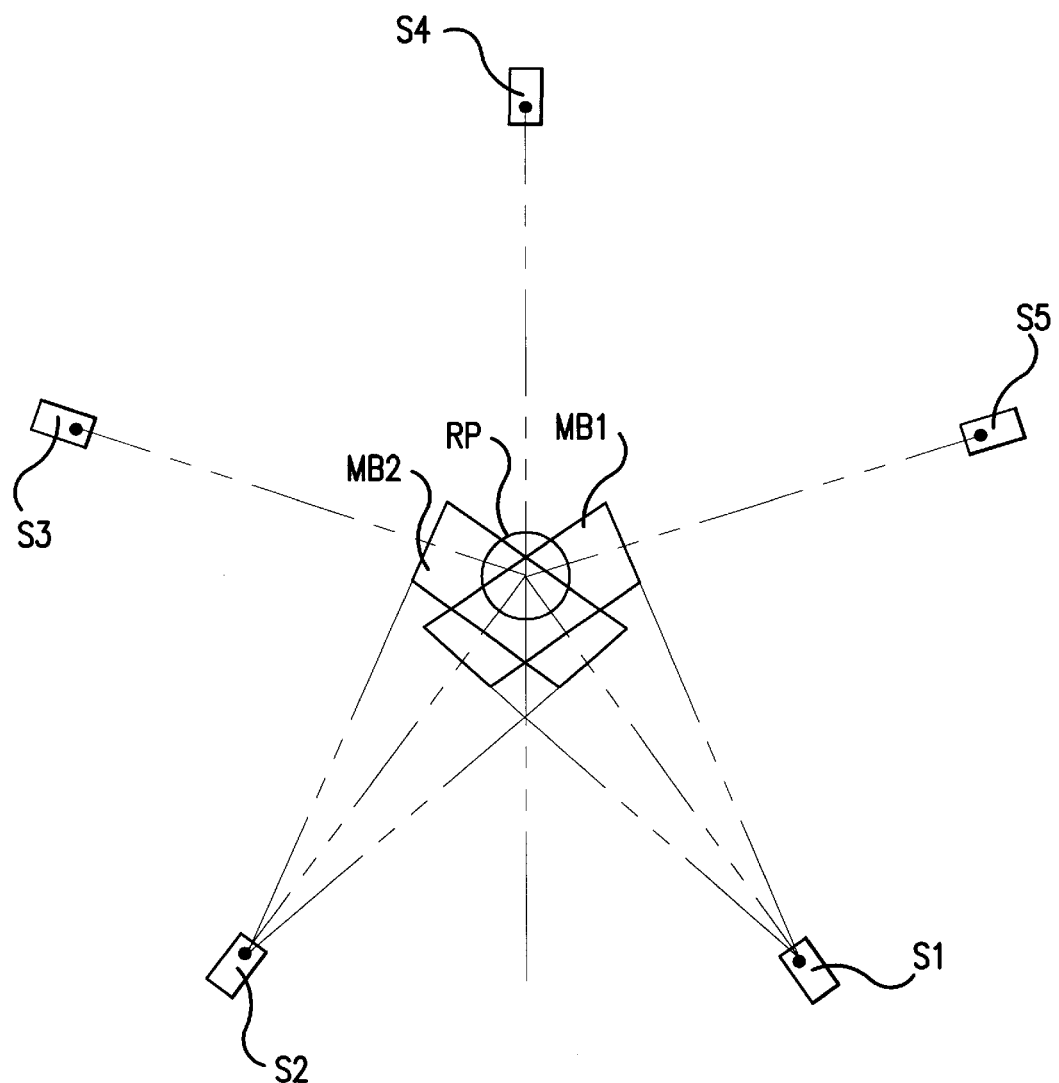
FIG. 3 shows a diagrammatic representation of a principle arrangement of five probes for measuring a round profile.

FIG. 3 illustrates the arrangement in principle of five triangulation scanners or probes S1, S2, S3, S4 and S5, which are arranged at 72° intervals around a profile RP to be measured. Each of the probes has a measurement region which is drawn in in each case for the probes S1 and S2 and designated MB1 and MB2 respectively. The probes S1 and S2 are positioned with respect to the round profile RP such that they scan particular surface or contour segments within the region MB1 or MB2 respectively. The two measurement regions MB1 and MB2 have a broad overlap which is a necessary precondition for evaluating the local measured data for bringing together the overall image of the contour of the profile. The measurement region which is effective in each case of the two measurement regions MB1 and MB2 is somewhat smaller, because of the necessity for overlap, than the measurement region which is in itself available to each individual probe S1 or S2.

Figure 4:
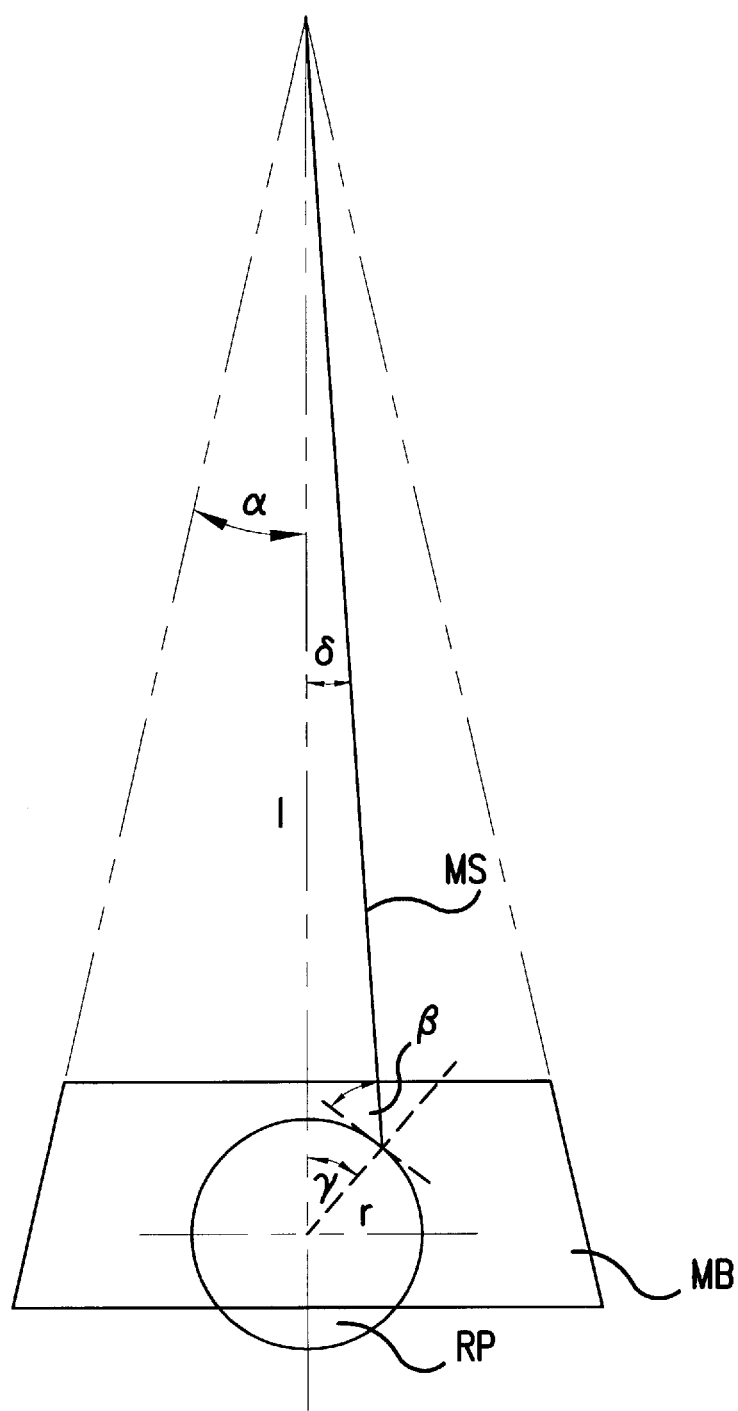
FIG. 4 shows a representation of the measurement region or of the measurement field of a probe and of the geometrical relationships, using the example of a round profile.

FIG. 4 shows the geometric relationships resulting between the measurement beam MS of a probe (not illustrated) and the surface to be measured of the round profile RP. The contour segment of the round profile RP which is associated with the probe or with the measurement beam MS is in the measurement region MB. The round profile RP which has been drawn in is to have an assumed diameter of 30 mm. The measurement beam MS meets the contour segment for a reflection angle of +45°. The reflection angle is that between the tangent which has been drawn in to the circle or to the segment contour at the impact point, and the measurement beam MS. The angle λ is calculated as follows:

$$\frac{\sin \alpha}{\sin(90° + 3)} = \frac{r}{1}$$

$$\alpha = \arcsin \cdot \frac{(r° \sin 135°)}{1}$$

$$\gamma = 180° - \alpha - (90° + \beta)$$

$$\underline{\gamma = 41.2°} \quad \text{where} \quad r = 15 \text{ mm}$$
$$l = 160 \text{ mm}$$

Thus, one probe covers a contour segment of 82.4° of the overall contour of the round profile RP.

Figure 5:
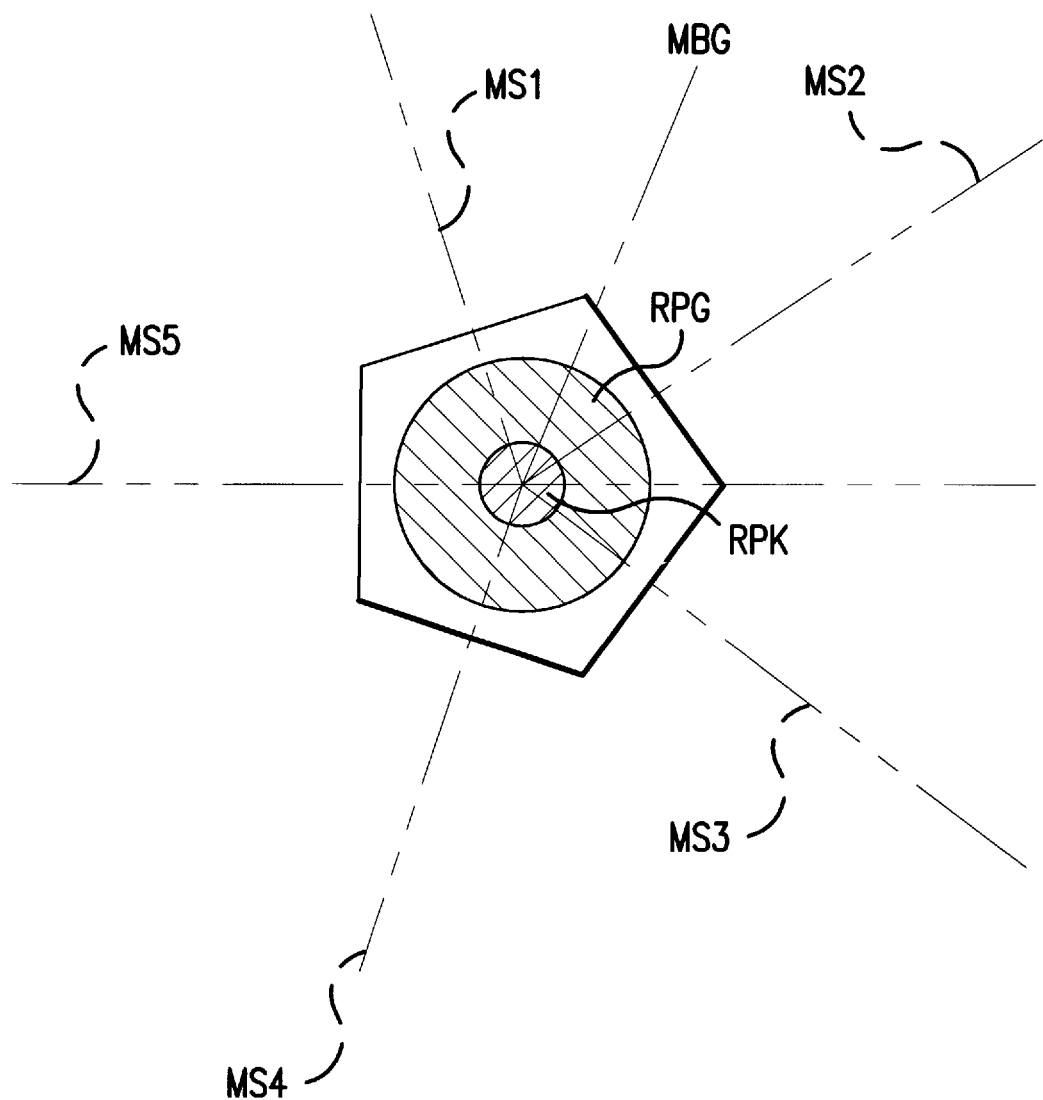
FIG. 5 shows a diagrammatic representation of five probes for measuring two different round profiles.

It can be seen from the illustration in FIG. 5 how a overall measurement region MBG resulting from the individual measurement regions (not illustrated) with a corresponding overlap is formed using an arrangement of 5 probes arranged to be equiangular (but not illustrated) and having corresponding measurement beams MS1, MS2, MS3, MS4 and MS5. In this measurement region MBG, for example round profiles of different diameters can be measured. If, instead of the larger round profile RPG, the smaller round profile RPK, that is to say provided with a correspondingly small diameter, is measured, then in accordance with the process according to the invention a higher measurement frequency automatically results because the measurement beams of the individual probes no longer attempt to scan the profile if there is no reflection.

Figure 6:
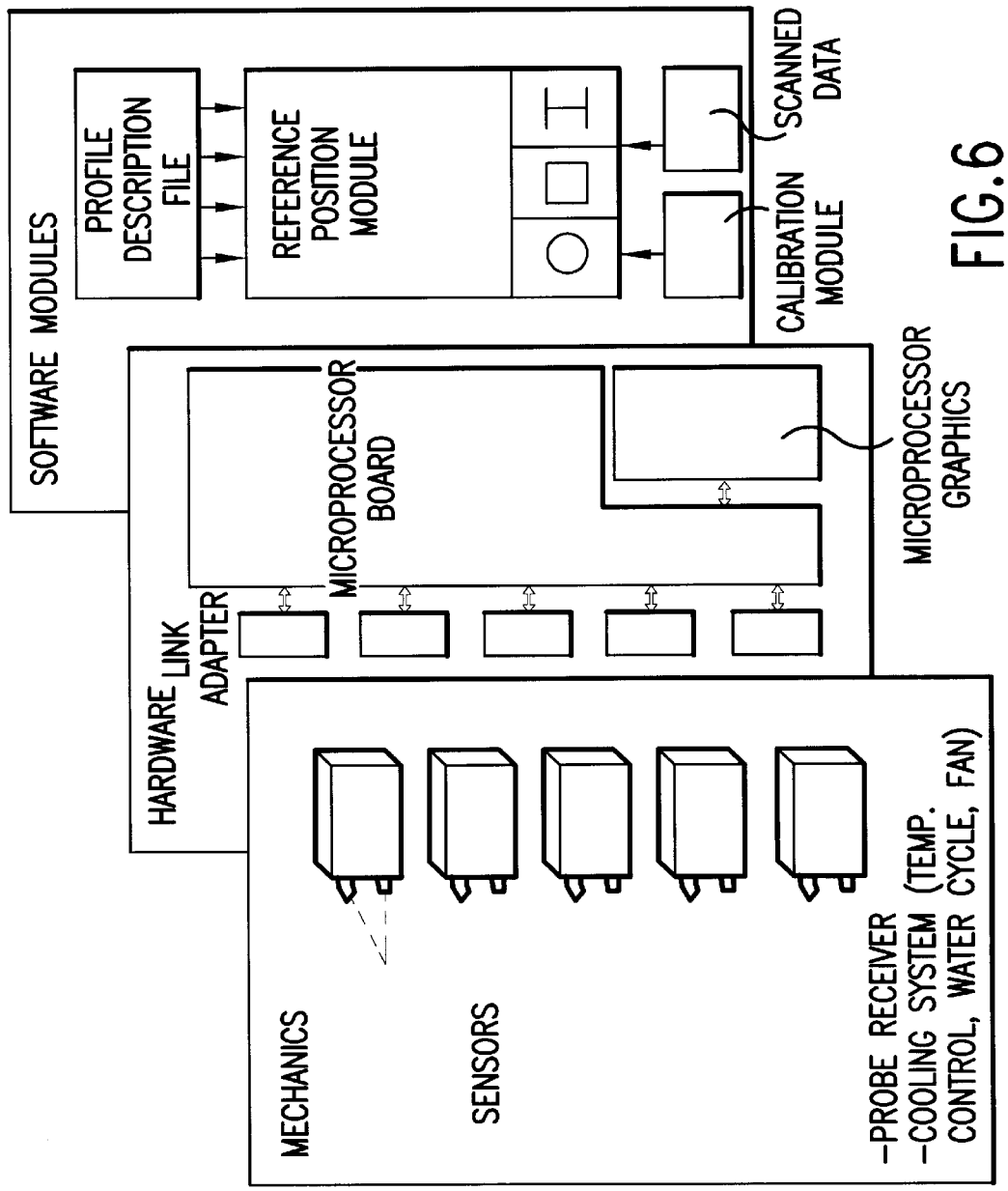
FIG. 6 shows a purely diagrammatic representation of the three units used in carrying out the process according to the invention: mechanics, hardware, software modules.

The overall system by means of which the process according to the invention can be carried out can be seen in FIG. 6. The first block shows, as the "mechanics", the number of probes used. The "hardware" block includes the link adapters providing the connection to the microprocessor system, i.e. the actual microprocessor board, and the microprocessor graphics. Behind this is the block for the "software modules", merely for illustration.

Figure 7:
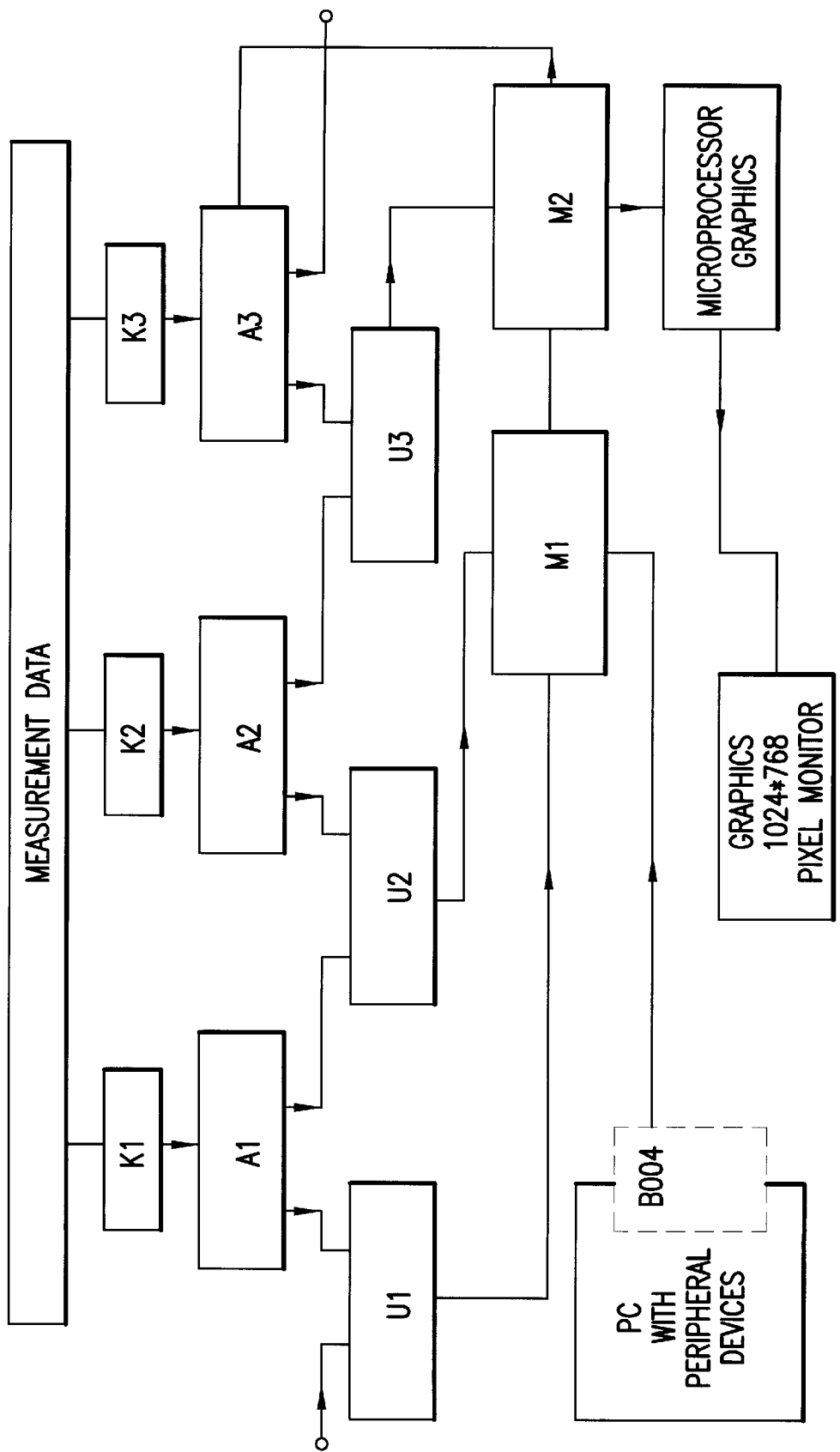
FIG. 7 shows a diagrammatic representation of the principle of a network topology as a block diagram.

In a typical application example, having a resolution capacity of the system of 2/100 mm, a measurement region of 40×40 mm and with a measurement frequency of 0.5 s, a data rate of 4000 value pairs per second and per scanner or probe results. The parallel processing technique for data reception and for processing is thus suitable. Furthermore, parameters which are obtained from the position calculation and the coordinate transformation can be passed on to the adjacent sections or microprocessor. A possible hardware topology with pre-processing stages, overlap stage and master stage is shown in FIG. 7. The tasks of coordinate transformation, calculation of the overlap data and compensation calculations, and the determining of the individual contour definitions and comparison with the set profile are divided amongst the individual stages. Since the data transmissions in a microprocessor take place independently of the CPU, the work steps of data reception, data processing and passing on data can take place at the same time.

In measuring profiles, the profile surface focal point is determined in order to draw the contour into the global coordinate system in a fixed reference position. The statistical functions which are also carried out with the parallel processing technique serve on the one hand for certain compensation and regression calculations and on the other hand for precise documentation of the profiles to be observed.

A particular advantage is offered by the possibility of building up the hardware in an extremely modular way. The number of microprocessor to be used depends, for example, on the above-listed tasks, graphic representation and the number of scanners or probes. A guide value for the number of microprocessor required is as follows:

Number of microprocessors=6+2*the number of probes

In the possible network topology illustrated as a block diagram in FIG. 7, a number of processing stages are different. The measured values are supplied from the scanners or probes, are converted by way of link adapters and are transferred to the respective associated microprocessor of the processing stage A. The microprocessor of the stage A have the function of eliminating the measured values to the left and right of the object, i.e. the measured values which are not reflected by the profile to be observed, and transforming the local coordinates into the reference system, and passing on the data to the microprocessor of the stage Ü.

The work stage Ü (overlap) takes on determining and compensating for the overlap region. If the deviations from the respective adjacent scanners or probes are too large, a message is generated which initiates re-calibration of the system. Each microprocessor of the stage Ü receives a particular profile range, a profile line, which when put together precisely reproduce the profile.

Further tasks are transferring the part parameters to the processing stage M and transferring the line definition to be passed on to the representation stage.

The processing stage M calculates from the part parameters of the individual line definitions particular characteristic variables, and with the aid of these the profile can be positioned and aligned. If the position and alignment do not agree with that of the set profile, then compensation parameters are emitted to the stage A, that is to say the coordinate transformation is processed by a control circuit such that the object agrees in its position and arrangement with the set profile.

The microprocessor of the stage M also have the function of sequence control. To represent the profile and its deviations, a mmicroprocessor graphics card with a high-resolution screen, for example 1024×768 pixels, is used. A PC serves to operate, log and store characteristic data. The task of the PC is also to detect the set profile, to manage the set profiles and to transfer the set profile and the set parameters to the microprocessor network.

Figure 8:
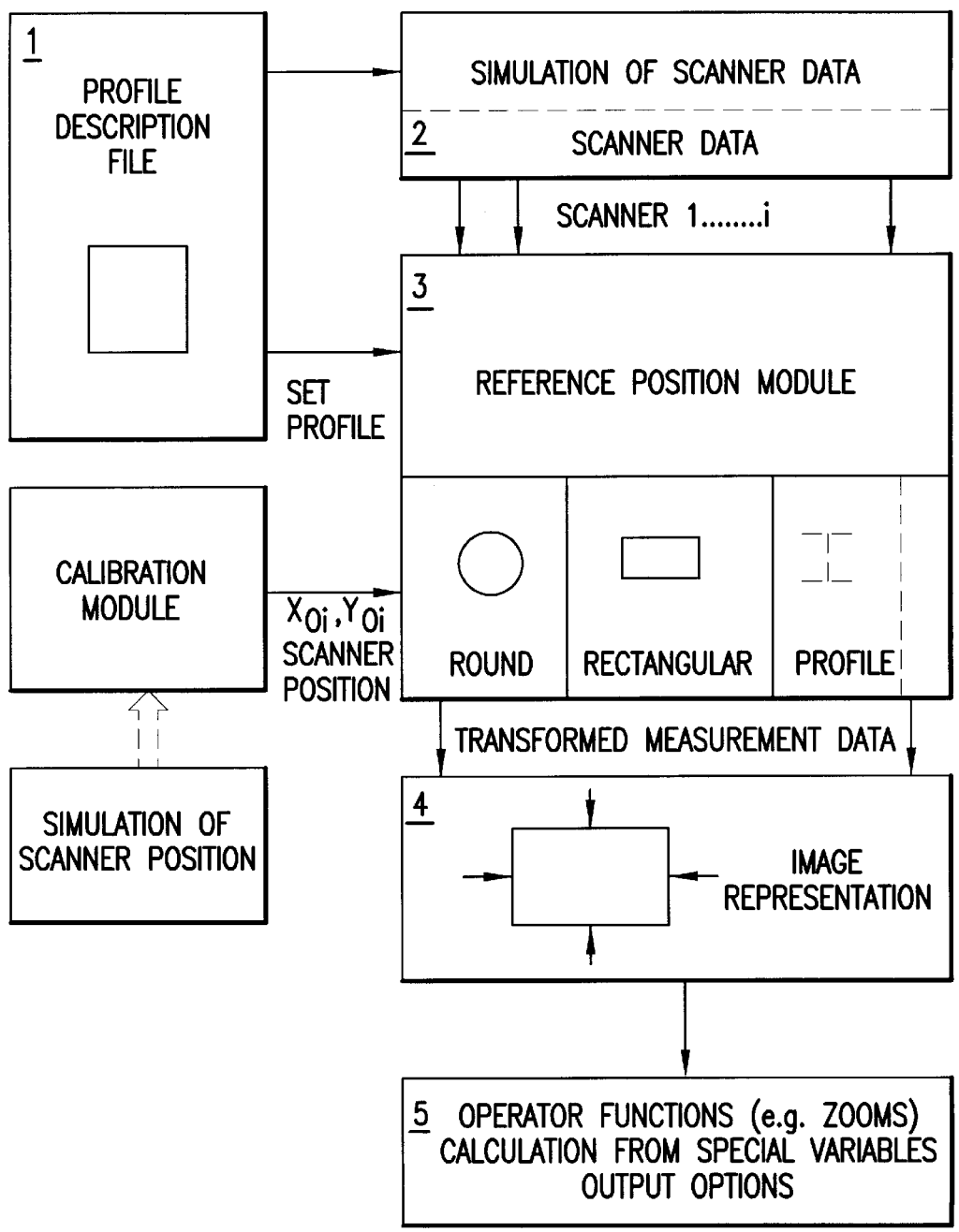
FIG. 8 shows a representation, also diagrammatic, of the software modules used within the context of the process according to the invention for profile observation, as a block diagram.

With reference to the block diagram of FIG. 8 for the software modules for profile observation, it should be noted that a calibration program is first of all necessary. This program calculates, with the aid of a reference workpiece, the exact position of the probes in the global coordinate system. The reference workpiece has precisely produced dimensions. Using the known dimensions of the workpiece and the recorded measured data, the Cartesian coordinates of the probes and the reflected beam directions are determined.

A further program is the reference position module. This module determines the actual profile as a function of the probe coordinates, the local measured data of the individual probes and the specifications for the set profile. Taking into account the possible material movements, the position of the profile in the global coordinate system and the specific profile dimensions are calculated.

Furthermore, there is a profile description file in which the data for the set profiles are specified.

Figure 9:
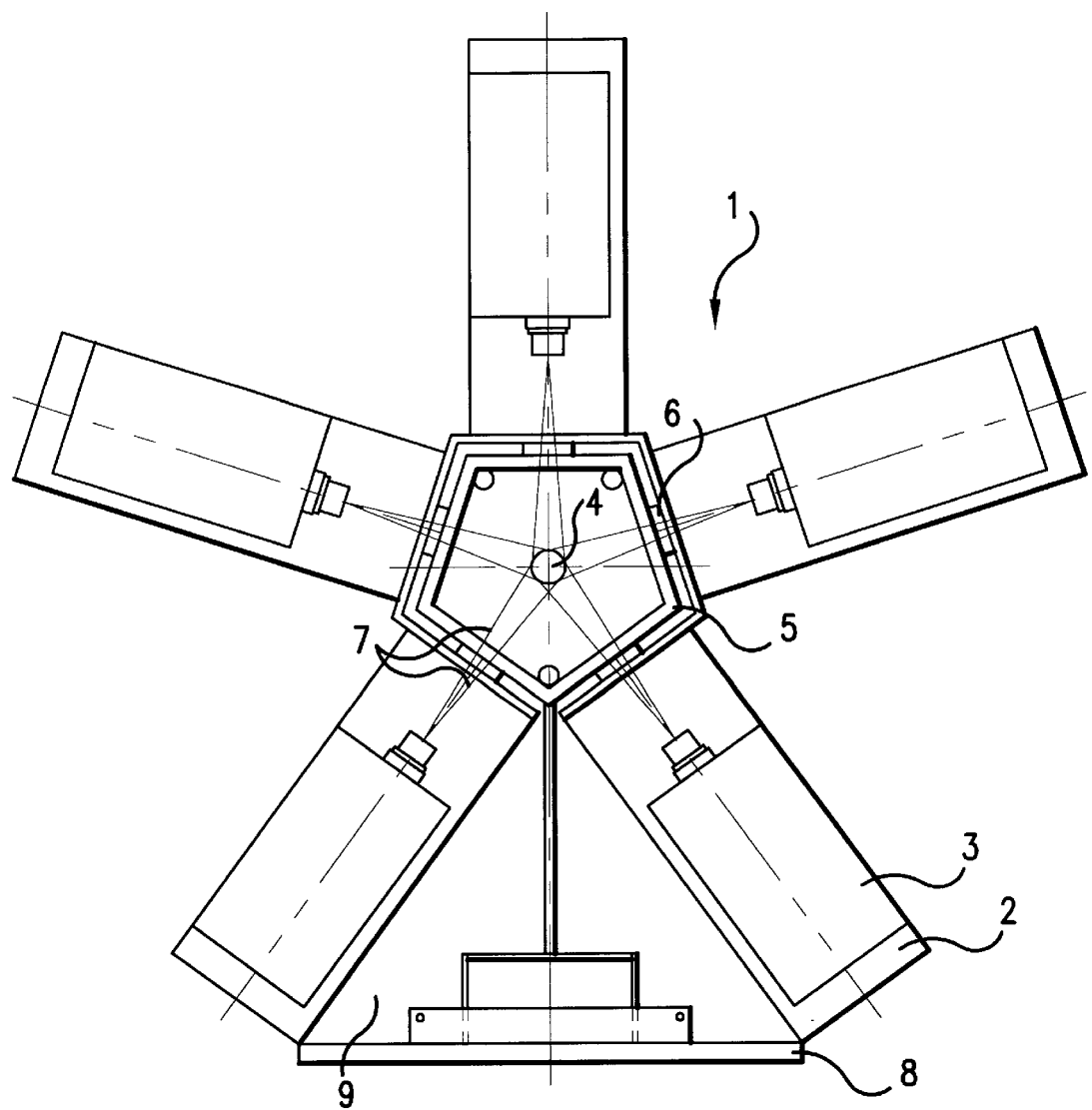
FIG. 9 shows a diagrammatic representation of the measurement apparatus in front view, having an arrangement of five probes similar to that in FIGS. 3 and 5.

An example of a measurement apparatus according to the invention, generally designated 1, can be seen from the illustration of FIG. 9, from which further details can be found in particular in FIGS. 10 to 13. It can be seen from the overall illustration in FIG. 9 that five probe carriers 2 having the same angular spacing are arranged in the shape of a star to receive one probe each for measuring a round profile 4 in a measurement chamber 5. The measurement beams, designated 7, of the probes 3 have access to the contour of the round profile 4 to be observed through windows 6 between the probe carriers 2 and the measurement chamber 5. The probe carrier star is integrated into a housing 9 resting on a base plate 8.

The arrangement is laid out such that an adequate overlap region between the individual probe scanning regions is produced. The overlap region results from the maximum permissible reflection angles.

The probes 3 are arranged in the selected embodiment such that they span a measurement field 40×40 mm in size by their permissible scanning range. The triangulation probes 3 used each have individually a measurement region of 70 mm and a minimum measurement region of 30 mm. The fastest scanning time resulting from the positioning and the illumination of the CCD line is 2 ms.

Figure 10:
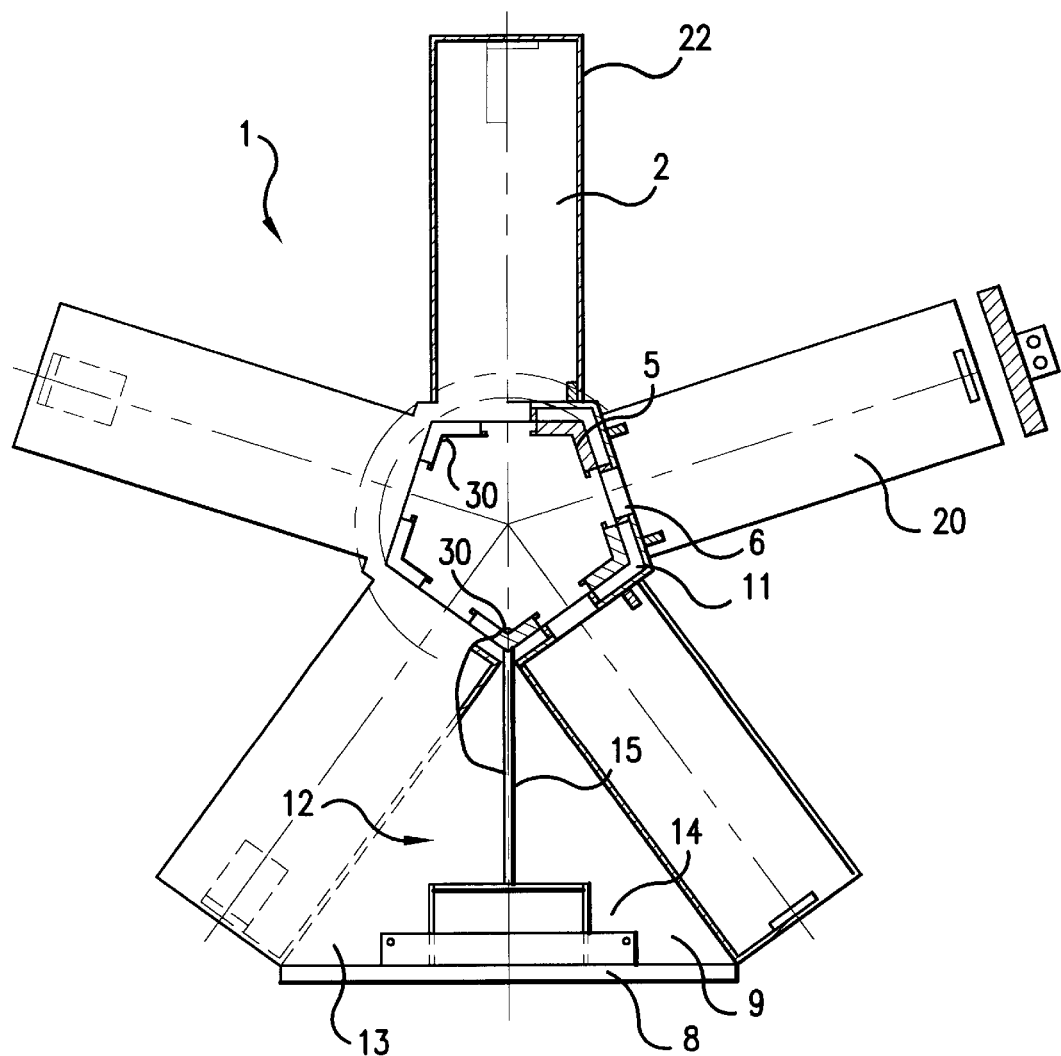
FIG. 10 shows a front view of the measurement apparatus similar to that in FIG. 9 but for representing details, partly in section.
Figure 11:
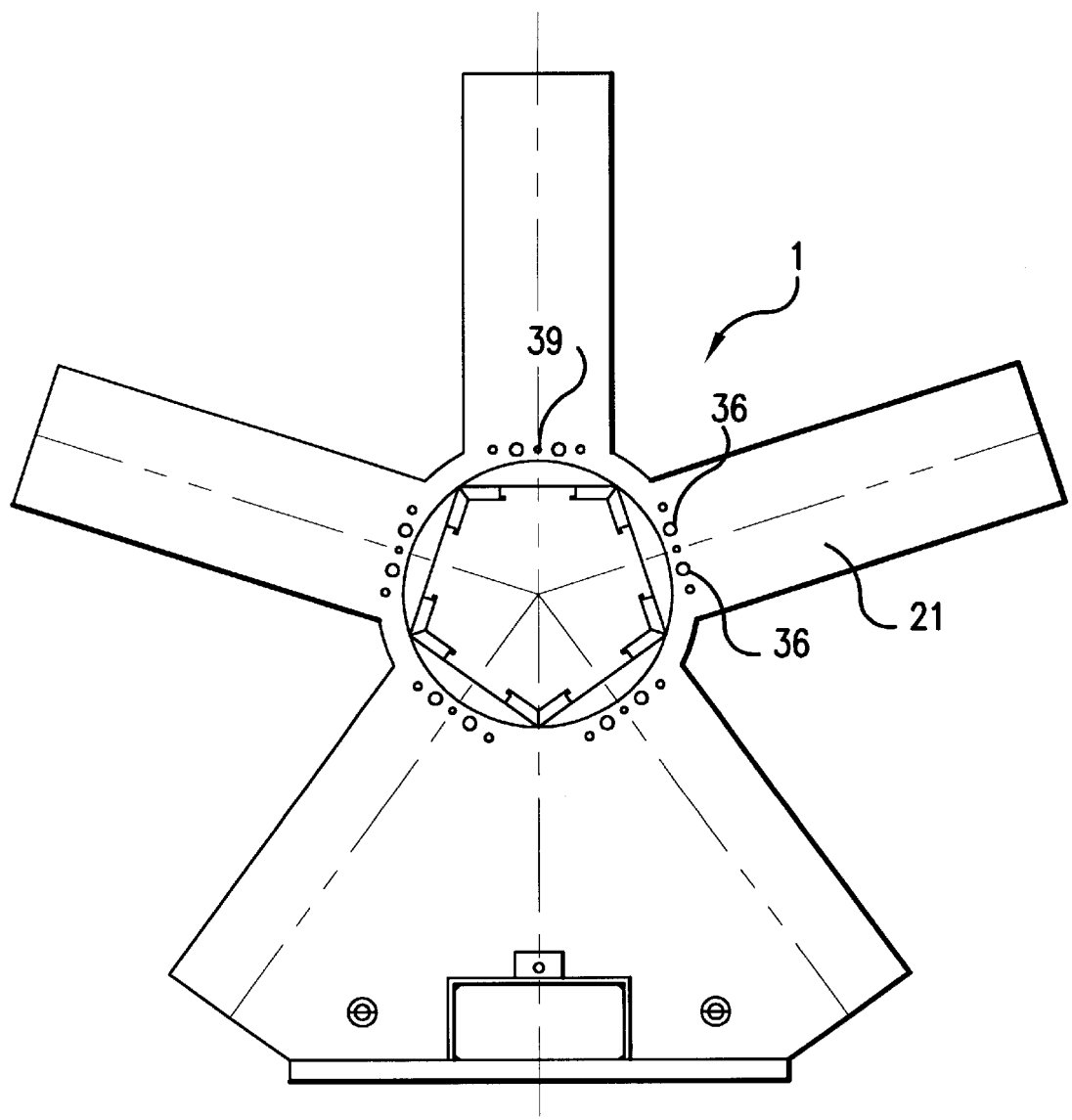
FIG. 11 shows a rear view of the measurement apparatus of FIG. 10.
Figure 12:
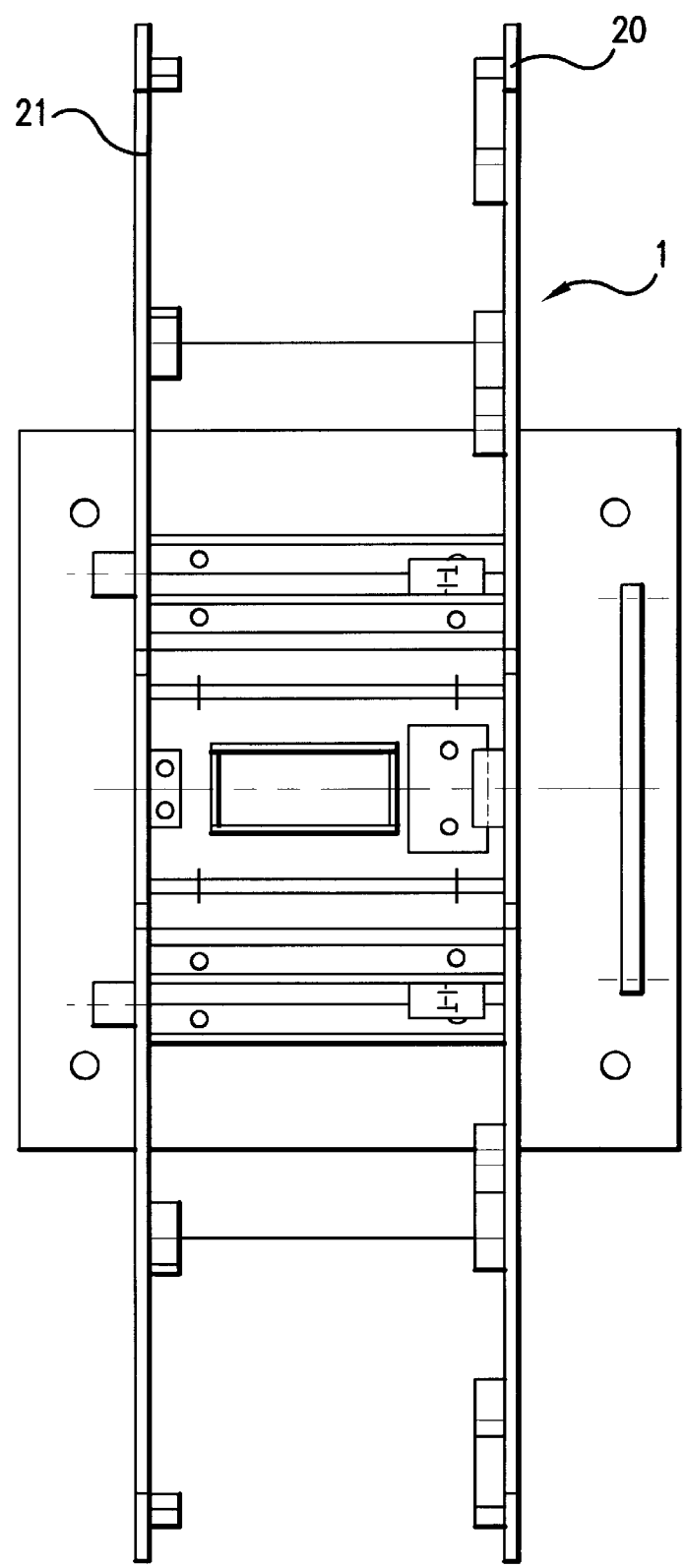
FIG. 12 shows a plan view of the measurement apparatus in accordance with FIGS. 10, 11.

FIG. 10 shows that the housing 9 terminates a water chamber, generally designated 12 and divided into two halves 13, 14 by a separating wall 15. As can be found in detail from FIG. 10, the measurement chamber 5 is constructed to be double-walled to form an annular channel 11. The annular channel serves for passing through coolants, such as in particular cooling water, and has the connection which can be seen from the drawing, to the water chamber halves 13, 14. The cooling water flowing into the first water chamber half 13 is guided in a cycle, as is illustrated by the arrows which have been drawn in, through the annular channel 11 and is finally guided back into the second water chamber half 14, in order from there to be supplied, re-prepared, to the first water chamber half 13. In this way, the measurement chamber 5 is effectively cooled or its temperature controlled.

In the present embodiment, the star-shaped probe carrier arrangement is formed from two plates 20, 21 which are arranged spaced from one another and from which the probe carriers 2 extend as arms, while the measurement chamber 5 is arranged in the common inner region. As can be seen in particular from FIG. 12, the two plates 20, 21 are rigidly connected to one another by the walls of the measurement chamber 5. The probe carriers 2 thus comprise two arms of the plates 20, 21 opposite one another at an appropriate spacing (cf. FIGS. 12, 13). These walls of the probe carrier 2 form, in each case with a hood 22, a closed probe chamber, each hood 22 comprising two housing halves, as FIG. 10 shows.

Figure 13:
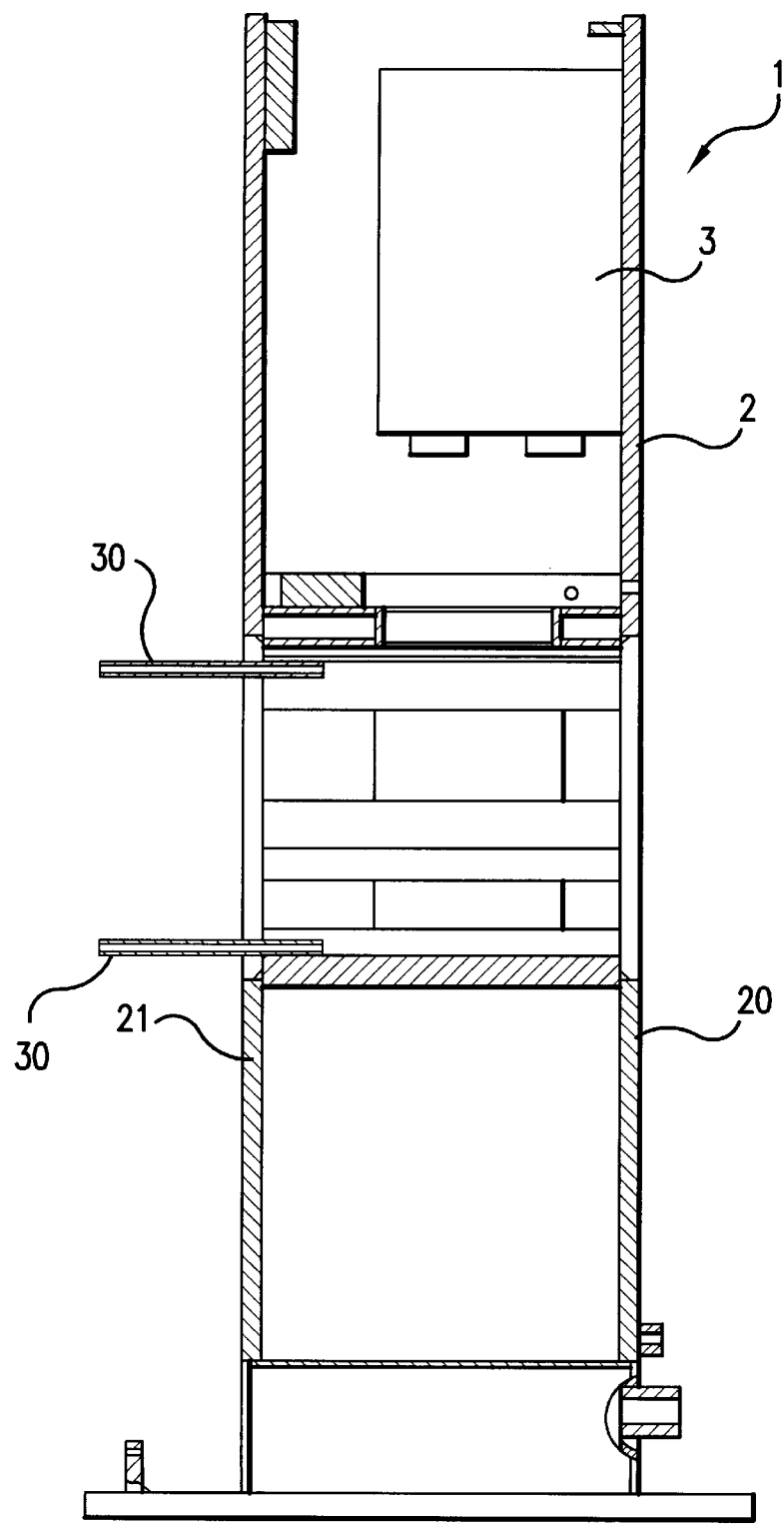
FIG. 13 shows a side view of the measurement apparatus of FIGS. 10 to 12, in vertical section.

In the side view, partly in section, of FIG. 13, there is indicated purely diagrammatically one of the probes 3 which is screwed to the probe carrier 2, formed by the arm concerned of the plate 20.

Figure 14:
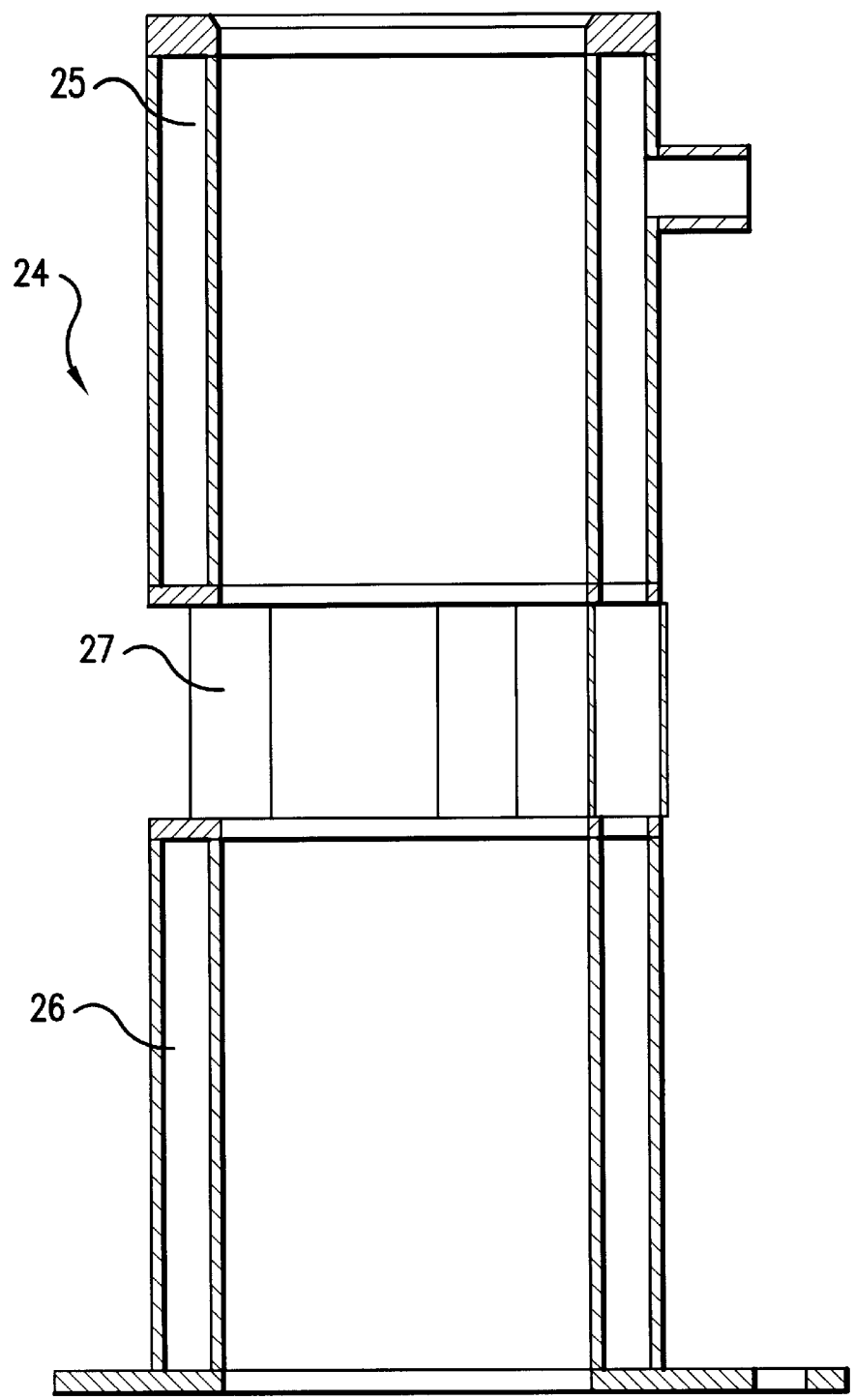
FIG. 14 shows a representation of the annular insert which can be integrated into the measurement apparatus, as a longitudinal section representation.
Figure 15:
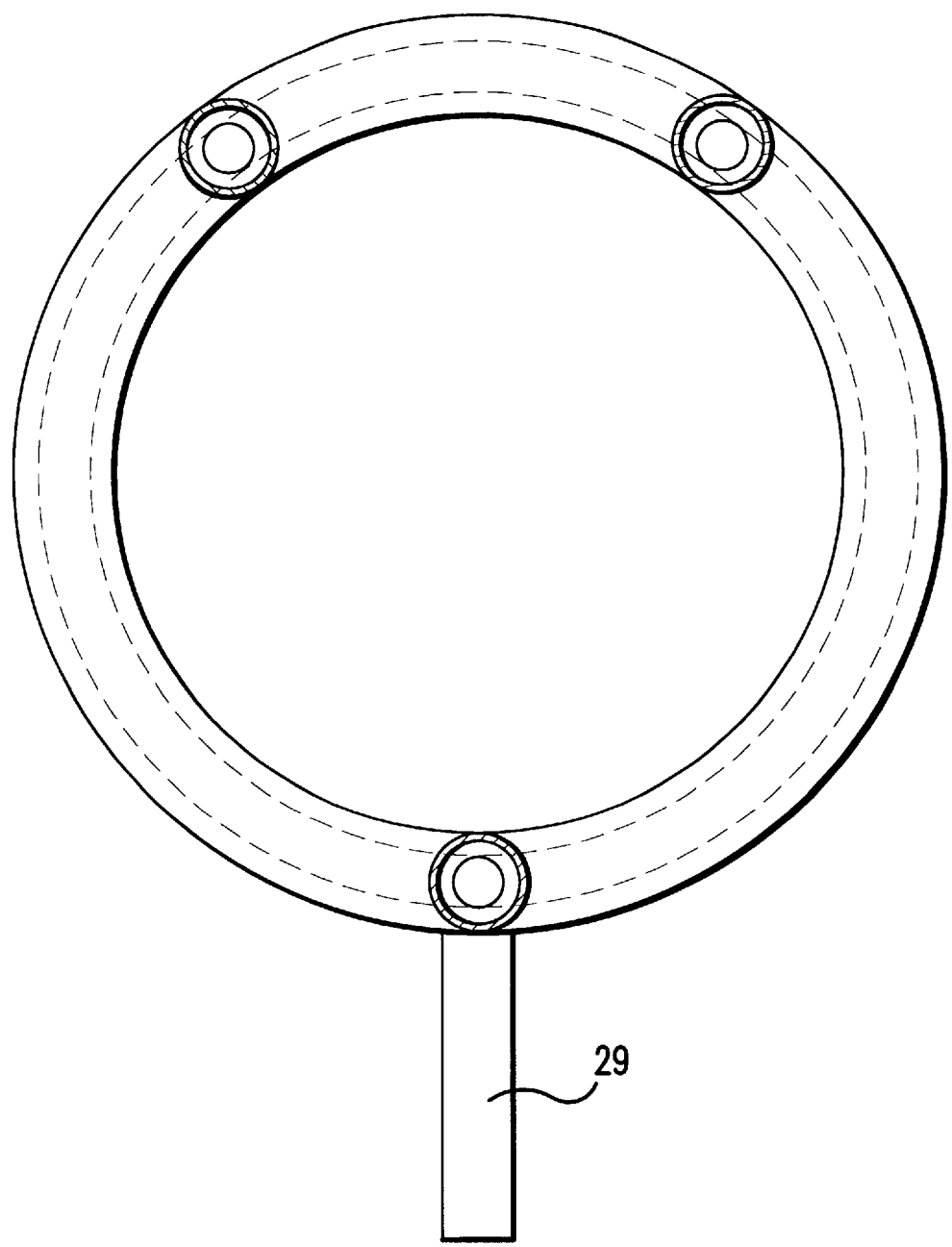
FIG. 15 shows a section representation of the annular insert of FIG. 14, along the line of section A—A of FIG. 14.
Figure 16:
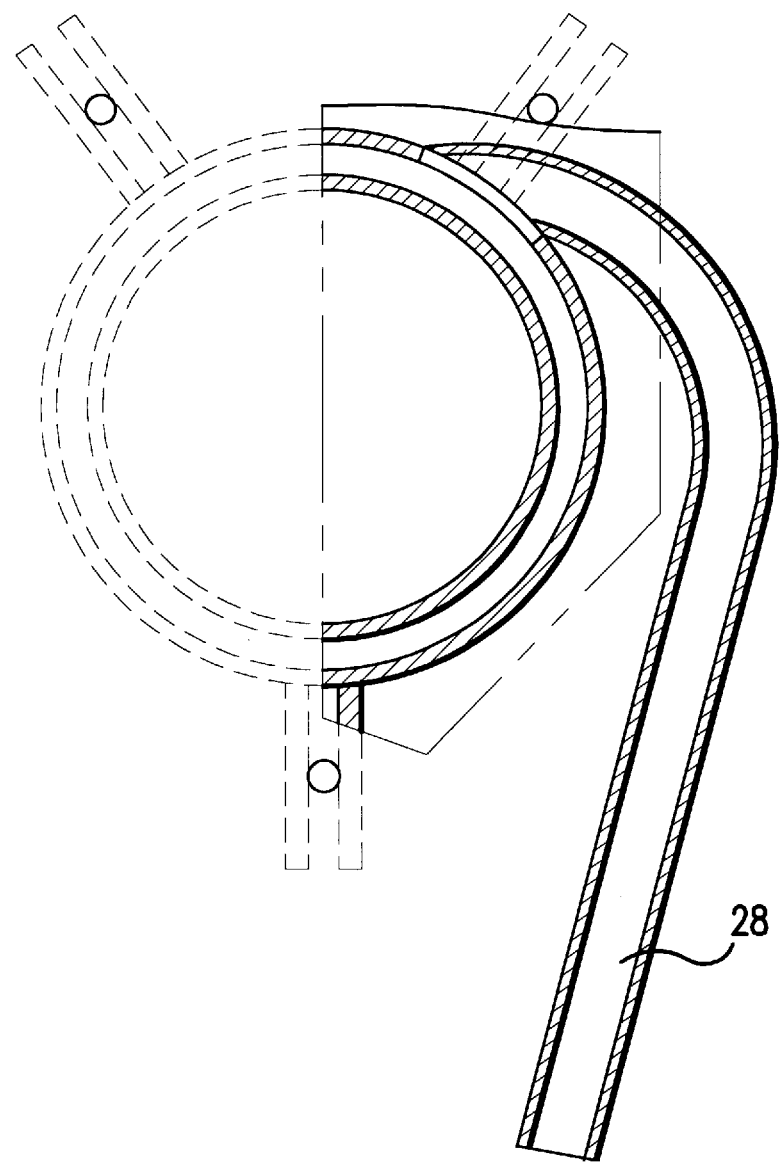
FIG. 16 shows a further cross-sectional view of the annular insert of FIGS. 14, 15.

FIGS. 14, 15 and 16 show an annular insert 24 which is of double-wall ed construction and also serves for cooling the measurement chamber 5. T he annular insert 24 comprises two annular chambers 25, 26 which are connected by way of connection pipes, in the present case three connection pipes 27. Cooling water is supplied through an inlet pipe 28 to the annular chamber 25, from which it emerges again by way of an outlet 29 (FIG. 15). The annular insert 24 is inserted into the measurement chamber 5 and positioned and secured by way of threaded rods 30 (FIG. 13).

Figure 17:
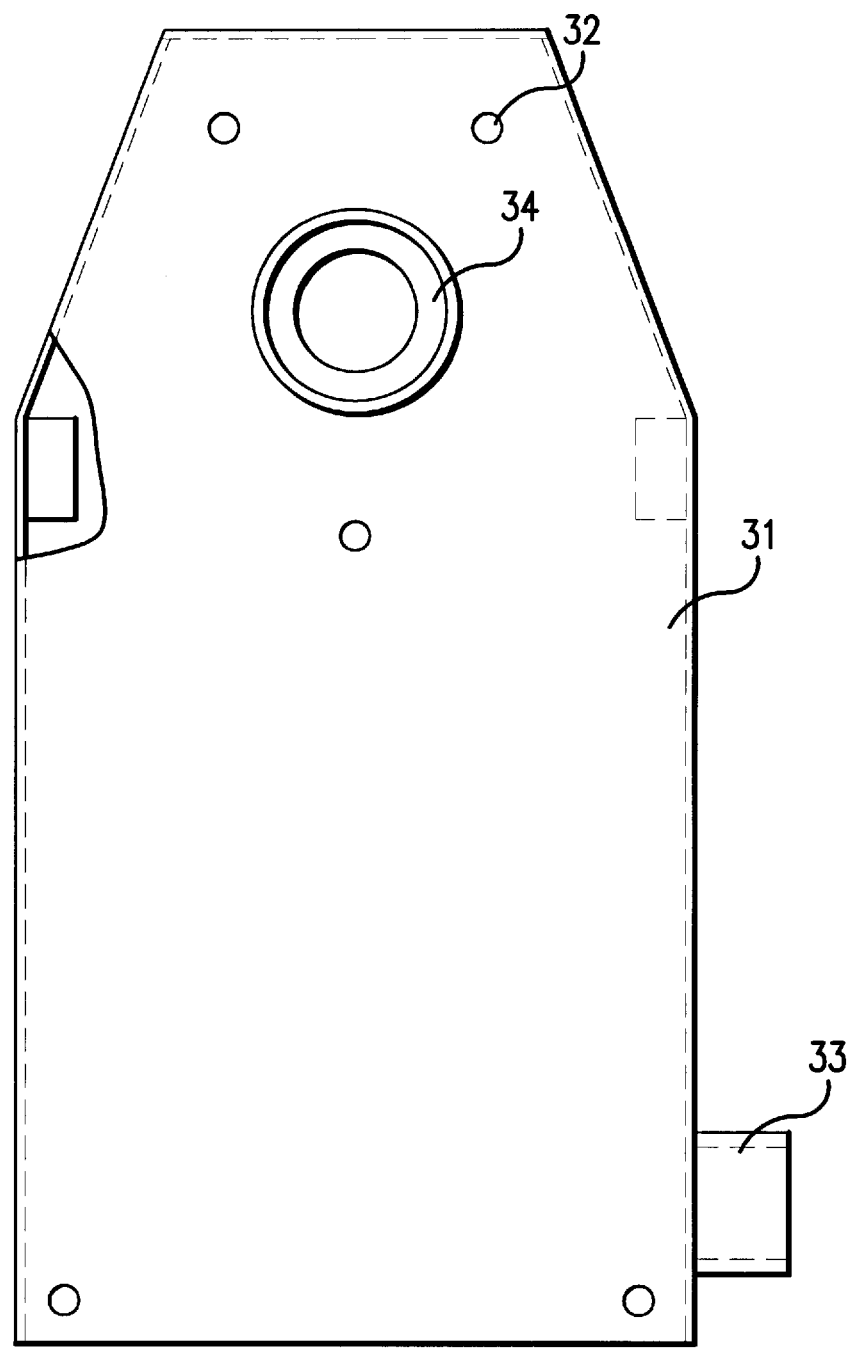
FIG. 17 shows a front view of a cover hood which can be connected to the measurement apparatus.
Figure 18:
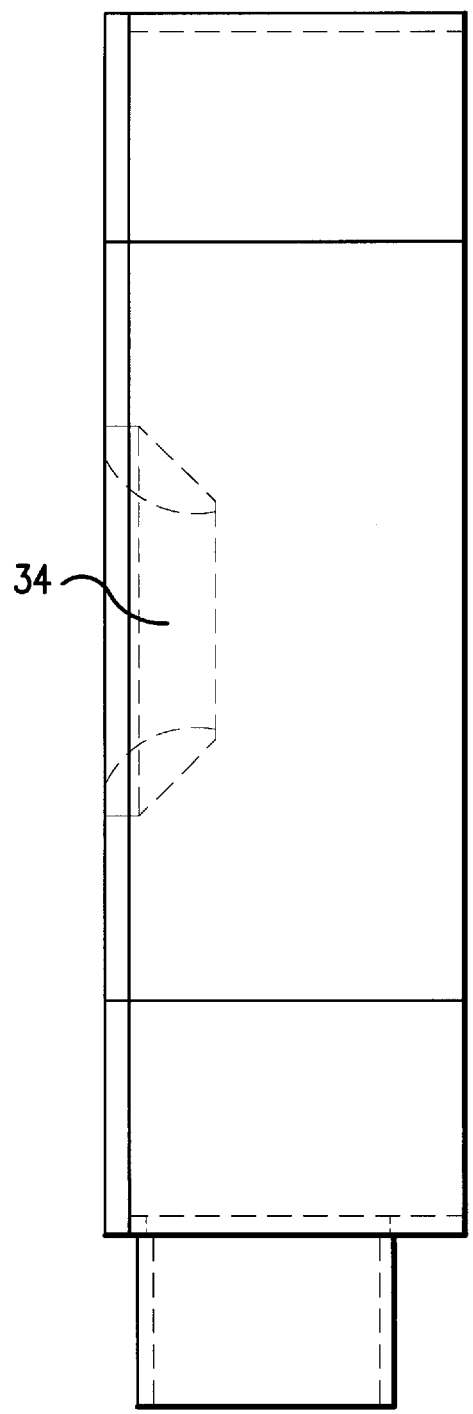
FIG. 18 shows a plan view of the cover hood of FIG. 17.
Figure 19:
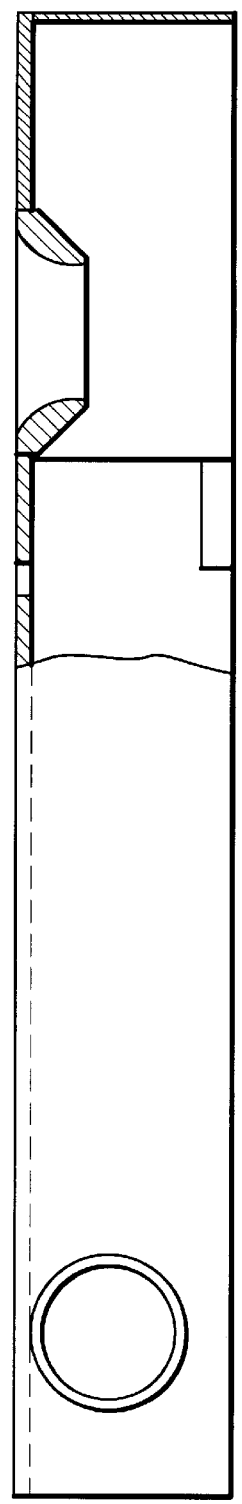
FIG. 19 shows a side view of the cover hood of FIGS. 17 and 18, partly as a longitudinal section representation.
Figure 20:
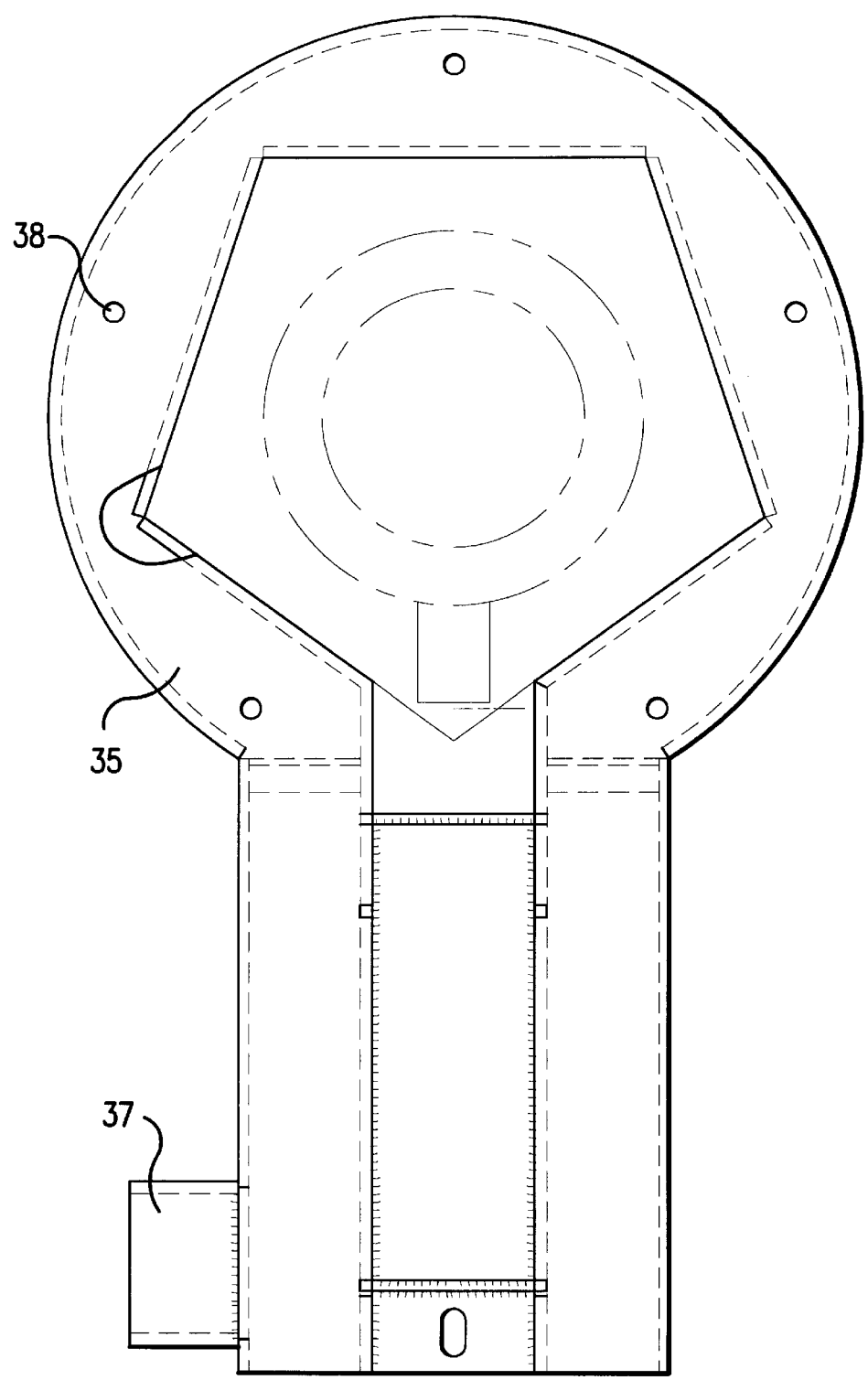
FIG. 20 shows a front view of a housing which can be attached to the measurement apparatus for aeration of the probe chambers.
Figure 21:
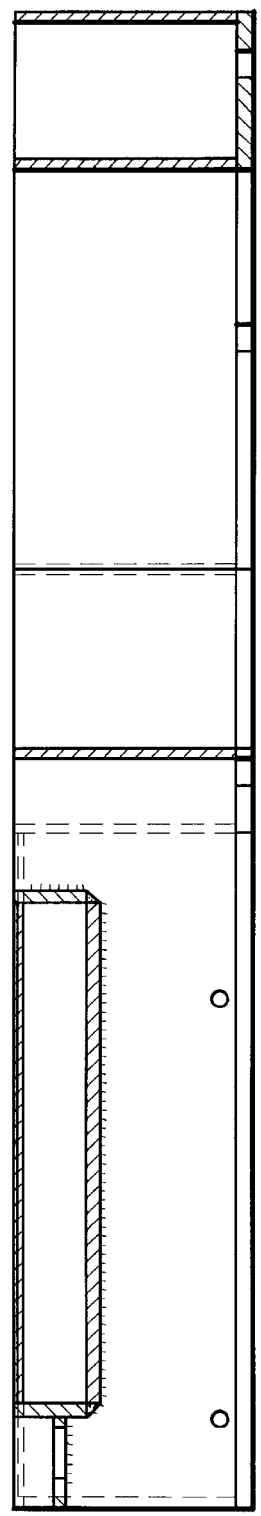
FIG. 21 shows a side view of the housing of FIG. 20, as a vertical section along the line A—A of FIG. 20.
Figure 22:
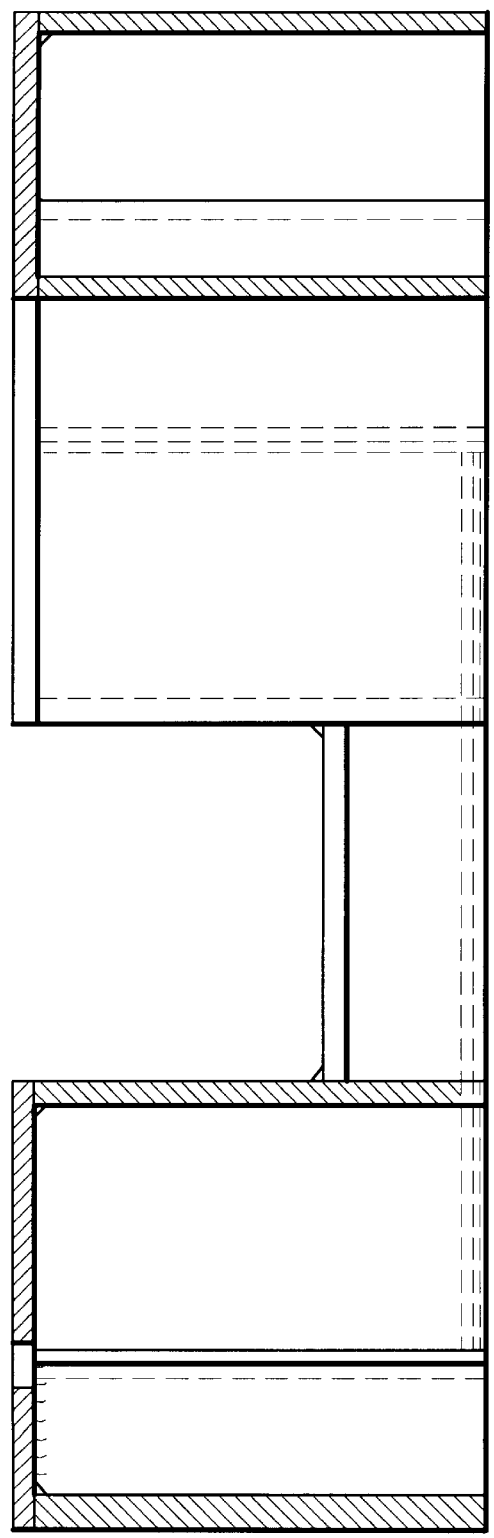
FIG. 22 shows a further representation of the housing of FIG. 20, in section along the line B—B of FIG. 20.
Figure 23:
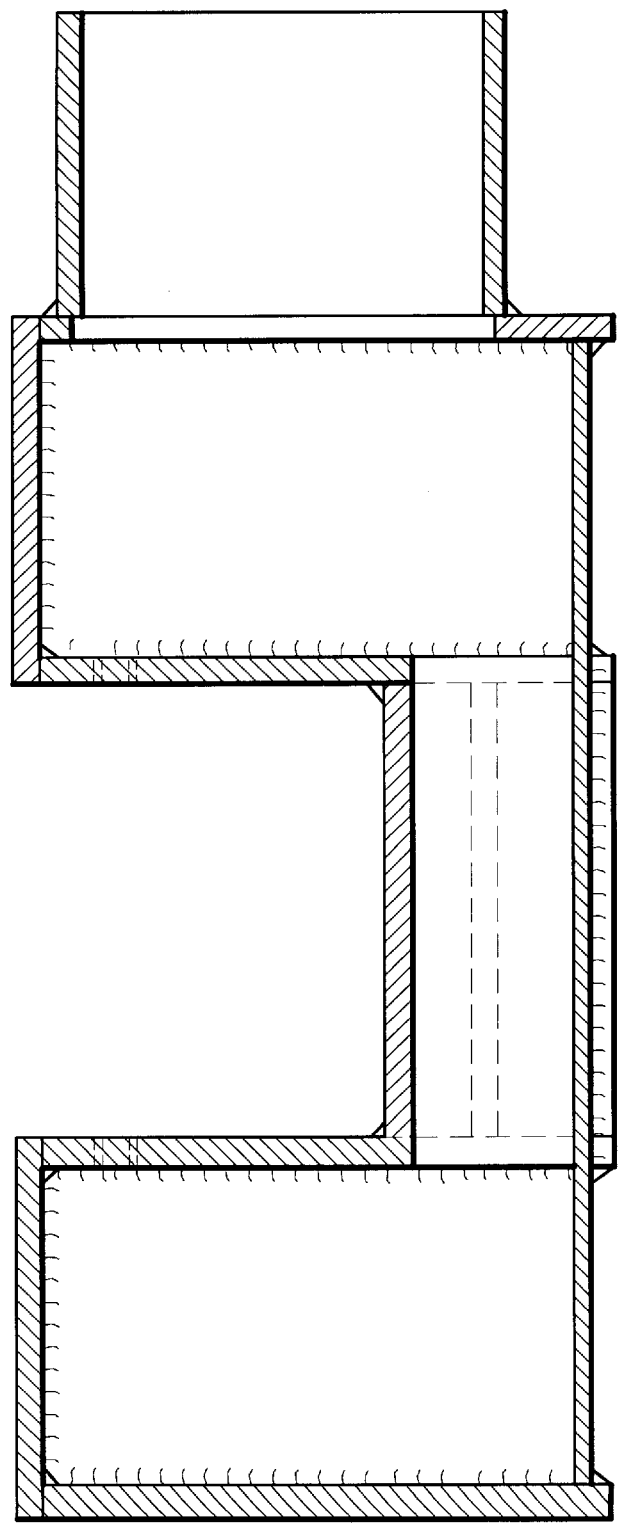
FIG. 23 also shows a representation of the housing of FIG. 20, along the line of section C—C of FIG. 20.

FIGS. 17–19 show a cover hood 31 which may also be connected to the housing 9 of the measurement apparatus by means of the threaded rods 30 and which has corresponding bores 32 for the threaded rods 30 to pass through. By way of an inlet 33 (cf. FIG. 17) cooling air is supplied and is guided under the cover hood 31 to the measurement chamber 5. 34 designates a possible restricted guidance for the profile to be measured. In any case, the opening for the supply of the profile to be observed in the measurement chamber 5 is located here. FIGS. 20, 21, 22, 23 show a housing 35 of an aeration system by means of which air which has been conditioned or temperature-controlled in a predetermined way can be supplied to the probe chambers by way of openings 36 (cf. FIG. 11). Supply is by way of the inlet 37, and from there the cooling air rises in the channel formed between the plate 21 and the housing 35 in order from there to pass through the openings 36 into the probe chambers. The openings 38 serve to guide through securing screws (not illustrated) which can be screwed into appropriate threaded bores 39 in the so-called hub region of the plate 21 (cf. FIG. 11).

What is claimed is:

1. A process for continuous and contactless measurement of the profile of a workpiece, wherein:
   probe means formed of a plurality of spaced a part laser beams continuously scan respective measuring regions of said workpiece in a predetermined manner, said laser beams being reflected off of said workpiece at said measuring points in accordance with the triangulation principle;
   a fixed receiver uses said laser beams reflected by said workpiece on the basis of the geometrical relationships of the spacing of each measured point of said probe determined in the form of local measured data;
   said plurality of spaced a part laser beams and said fixed receiver are arranged in a mounting all around said profile and spaced therefrom and are arranged in predetermined angular positions with respect to one another such that a contour segment of said profile is associated with said measurement region of each respective said laser light beam as a surface segment;
   the measurement regions of adjacent said laser light beams overlap one another;
   the overall contour which is to be measured, said profile, is determined by the measurement regions;
   a system calibration using a reference workpiece with precise contours and dimensions is carried out by determining the positions of said laser light beams; and
   the data of said system calibration, predetermined set data of said profile and said local measured data resulting at the point of intersection of the measurement between with said workpiece are transferred together with a position calculation for said profiles to be measured and by way of coordinate transformations to a global coordinate system and grouped together to form an overall image.

2. A process according to claim 1, wherein said laser beams are reflected in planes offset and parallel to the axial direction of said workpiece.

3. A process according to claim 1, wherein said laser beams are arranged symmetrically around said workpiece in angular steps of the same size.

4. A process according to claim 1, wherein said workpiece can be guided restrictedly in front of and behind a measurement plane of said workpiece.

5. A process according to claim 1, wherein said local measured data is evaluated by a parallel processing technique using link adapters, microprocessor units, microprocessor graphics and software modules using a profile description file, a reference position module, calibration modules and scanner data.

6. Process according to claim 1, wherein the profiles are moved in their axial direction during the measurement.

7. An apparatus for the measurement of profiles, characterized in that a plurality of probes are arranged around a measurement chamber in a measurement apparatus in the shape of a star with a preselected angular position with respect to one another, measurement beams of said probes may be directed substantially inwards towards said measurement chamber through which the profile to be measured may be moved axially, wherein said probes scan said profiles in a predetermined manner in accordance with the triangulation principle.

8. An apparatus according to claim 7, characterized in that each of said probe is associated with a probe carrier which is secured adjustably thereto, said probe carriers being secured to the inside of said measurement chamber.

9. An apparatus according to claim 8, characterized by removable hoods which form substantially closed probe chambers on said probe carriers.

10. An apparatus according to claim 8, characterized in that said measurement chamber is divided off from said probe carriers by a wall having measurement windows.

11. An apparatus according to claim 8, characterized in that a water chamber having water connections is arranged below said measurement chamber between two of said probe carriers, wherein cooling water is supplied to an annular channel of said measurement chamber.

12. Apparatus according to claim 7, characterized in that an annular insert which is formed from two annular chambers connected to one another in said measurement chamber by connection pipes running outside the measure beams to guide through media capable of flow may be inserted substantially coaxially into said measurement chamber and may be secured there and is provided with connections for the supply and removal of flow media.

13. An apparatus according to claim 7, characterized in that said probes can be connected to an aeration system by means of which air which has been conditioned in a predetermined way can be supplied to said probes.

14. An apparatus for continuous and contactless measurement of the profile of a workpiece, said apparatus comprising:
   probe means positioned a predetermined distance from said workpiece for scanning a measuring region of said workpiece in accordance with the triangulation principle, said probe means including a plurality of spaced a part laser light means for producing a laser beam of light for scanning said workpiece and light moving means for moving said laser beams about measuring points within said measuring region in a predetermined manner, said laser beams being reflected off of said workpiece at said measuring points;

receiver means for receiving the reflected laser beams from said workpiece, said receiver means including measuring means for measuring the distance between said workpiece and said probe means on the basis of the geometrical relationship of the spacing of each of said laser light means to produce a set of locally measured data indicating the profile of said workpiece.

15. The apparatus of claim 14, wherein said light moving means moves said laser beams about said measuring points in variable steps.

16. The apparatus of claim 14, wherein said light moving means moves said laser beams about said measuring points in pre-settable steps.

17. The apparatus of claim 14, wherein said laser light means and said receiver means are arranged around the profile of said workpiece and spaced therefrom at predetermined angular positions with respect to one another such that a contour segment of the profile of said workpiece is associated with the measuring region of each of said laser light means.

18. The apparatus of claim 17, wherein said measuring regions of each of said laser light means overlap one another.

19. The apparatus of claim 14, further including system calibration means using a reference workpiece with precise contours and dimensions for calibrating said apparatus.

\* \* \* \* \*